United States Patent [19]
Konijn

[11] 3,820,497
[45] June 28, 1974

[54] TRANSPORT VEHICLE

[75] Inventor: Nicolaas Gerardus Konijn, Berkhout, Netherlands

[73] Assignee: Konijn Machineblouw N.V., Hoorn, Netherlands

[22] Filed: Nov. 15, 1972

[21] Appl. No.: 306,589

[30] Foreign Application Priority Data
May 31, 1972 Netherlands .................. 7207331

[52] U.S. Cl. .................. 115/1 R, 115/19, 180/7 R
[51] Int. Cl. .............................................. B60f 3/00
[58] Field of Search ............ 115/1 R, 9, 19, 28, 31, 115/24.1–24.5; 180/7 R; 280/34 R

[56] References Cited
UNITED STATES PATENTS

| | | | |
|---|---|---|---|
| 2,565,714 | 8/1951 | Anderson | 115/24.3 |
| 2,918,738 | 12/1959 | Barr | 115/1 R |
| 3,057,319 | 10/1962 | Wagner | 115/1 R |
| 3,264,009 | 8/1966 | Langendorf | 280/34 R |
| 3,306,390 | 2/1967 | Jamme | 280/34 R |
| 3,348,518 | 10/1967 | Forsyth et al. | 115/1 R |
| 3,446,175 | 5/1969 | Boehler et al. | 115/1 R |

FOREIGN PATENTS OR APPLICATIONS

| | | | |
|---|---|---|---|
| 767,420 | 2/1957 | Great Britain | 280/34 R |
| 1,234,801 | 6/1971 | Great Britain | 280/34 R |

*Primary Examiner*—George E. A. Halvosa
*Assistant Examiner*—Edward R. Kazenske
*Attorney, Agent, or Firm*—Eric H. Waters

[57] ABSTRACT

A transport vehicle having a main body and adapted to displace itself overland and/or through water. A plurality of legs are each pivotally connected with the main body and each carries a reaction body at its free end which may be swung by means of a power mechanism, with respect to the main body in such manner that the vehicle is displaced by the reaction forces exerted on the reaction bodies. Each leg may be pivotable with respect to the main body about a vertical axis and/or a horizontal axis.

5 Claims, 2 Drawing Figures

PATENTED JUN 28 1974 3,820,497

3,820,497

TRANSPORT VEHICLE

BACKGROUND OF THE INVENTION

The invention relates to a transport vehicle having a main body and adapted to displace itself overland and/or through water.

SUMMARY OF THE INVENTION

It is an object of the invention to provide a vehicle of this kind adapted to displace itself in substantially inaccessible areas, for instance in swamps.

According to the invention a plurality of legs, each pivotally connected with the main body and each carrying a reaction body at its free end, may be swung, by means of a power mechanism, with respect to the main body in such manner that the vehicle is displaced by the reaction forces exerted on the reaction bodies.

In order to obtain said swinging movement, each leg may be pivotable first of all about a vertical axis with respect to the main body. However, it is of advantage in many cases, if the legs are also pivotable with respect to the main body about a horizontal axis. As an alternative for the last-mentioned possibility or in combination with the same each reaction body may be rotatable with respect to the associated leg through an angle defined by abutments and about an axis of rotation coincident with or parallel to the longitudinal axis of the leg.

In order that the vehicle may displace itself through a terrain in which normal driving is impossible or very difficult, for instance, in a very swampy terrain, it is preferred to use an embodiment of the vehicle of which the legs are pivotable with respect to the main body both about a vertical and about a horizontal axis.

In this case, the legs are turned to the front with respect to the main body as seen in the desired direction of movement of the vehicle and pressed on the ground with their reaction bodies, after which the legs are controlled in such manner by their power mechanisms that the main body is displaced to the front with respect to the points of support of the reaction bodies.

According to circumstances, for instance to the number of legs connected with the main body, the main body may either remain completely free from the ground or be dragged over the ground or be alternately supported on the ground and lifted from the ground during said displacement of the legs. In the latter case the main body is preferably supported on the ground, while the legs are moved to the front and pressed on the ground with their reaction bodies, after which the main body is lifted and subsequently displaced to the front.

Although it is not absolutely necessary in this manner of movement that the reaction bodies are rotatable through an angle defined by abutments and about an axis of rotation coinciding with or parallel to their longitudinal axis, it may be of advantage to provide this possibility of rotation in order that the reaction bodies may be optimally supported on the ground, if the vehicle moves over a very irregular terrain.

If the main body is floatable in water, so that the vehicle may be used as a vessel, the invention provides the possibility of propulsion in cases wherein the use of a screw propeller is impossible or very difficult due to certain circumstances, for instance to vegetation or water pollution.

If the legs are pivotable with respect to the main body both about a vertical and about a horizontal axis, it is possible in this case to displace the legs with a composite horizontal and vertical swinging movement, in such manner that the reaction bodies perform an active stroke under the water surface and a return stroke above the same.

As an alternative, the vehicle may also move through the water by means of legs exclusively pivotable with respect to the main body about a vertical axis; however, in this case the reaction bodies must be rotatable with respect to the associated legs through an angle defined by abutments and about an axis of rotation coinciding with or parallel to their longitudinal axis.

In the use of this embodiment, the legs are exclusively swung to the front and to the back, while the reaction bodies remain under the water surface and occupy such a position during the active stroke that a large surface is perpendicular to the direction of movement, but are rotated during the return stroke in such manner that only a small surface is perpendicular to the direction of movement.

In both above-mentioned cases, the reaction bodies may occupy an inclined position during the active stroke, so that a lift is exerted, whereby the vehicle is moved upward during the active stroke, so that the resistance exerted on the body is reduced.

The reaction bodies may consist of rollers or the like and may be hollow, so that they have a sufficient floating capacity in swampy areas.

As an alternative the reaction bodies may be plate-shaped.

It is of advantage that the points at which the legs engage the main body are pairwise symmetrical with respect to the vertical center plane of the main body.

In this case all legs may engage the main body at or near the sides of the same.

In its most simple form the vehicle is provided with only two legs.

In an alternative embodiment, the vehicle is provided with four legs engaging the main body at or near its corners.

Of course, it is also possible to use a larger number of legs.

It is preferred that the legs may be brought by a rotation about the said vertical axes into a position in which they are in parallel with the vertical center plane of the main body.

If the reaction bodies are constructed as rollers or the like, the vehicle may be driven by means of the reaction bodies, if the terrain allows for such displacement.

The power mechanism for each of the legs may comprise one or more cylinder-piston units.

DESCRIPTION OF A PREFERRED EMBODIMENT

Figure 1:
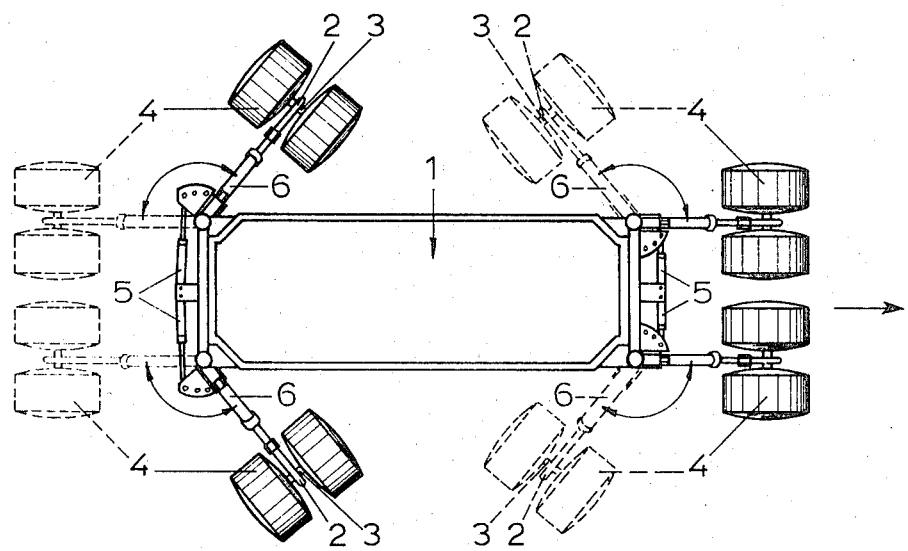
FIG. 1 is a top view of a vehicle according to the invention.

The vehicle shown in the drawings is adapted to displace itself overland and through water and comprises a main body 1 of substantially rectangular plan form as seen in FIG. 1 provided with four legs 2, each engaging the main body preferably at one of the corners thereof.

Each of the legs 2 is pivotable with respect to the main body 1 about a vertical and a horizontal axis.

At its free end each leg carries a reaction body consisting in the embodiment as shown of two rollers 4 supported by an axle 3 perpendicular to the leg 2. Each axle 3 may be rotated about the longitudinal axis of the associated leg 2 together with the rollers 4 and through an angle defined by abutments (not shown).

Each of the legs 2 may be pivoted with respect to the main body 1 by means of a power mechanism comprising, in the embodiment as shown, two cylinder-piston units 5 and 6.

The legs 2 may be constructed in telescope fashion in order to obtain an adjustable length.

If the vehicle must move over a swampy terrain, the legs 2 are turned to the front as seen in the desired direction of movement of the vehicle with respect to the main body 1, after which the rollers 4 are pressed on the ground. The rollers 4 may be hollow so as to generate a considerable upward pressure, when they are completely or partially submerged in a swampy terrain.

It is also possible to use the hollow rollers 4 as fuel tanks. As soon as the rollers 4 have been pressed on the ground, the legs 2 are controlled in such manner by the cylinder-piston units 5 and 6 that the main body is displaced to the front with respect to the points of support of the rollers 4 on the ground.

Figure 2:
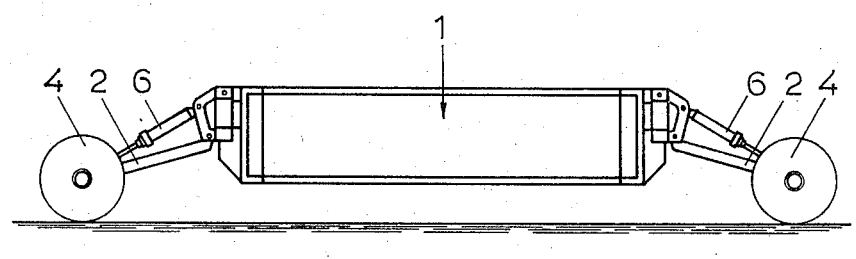
FIG. 2 is a side view of the same vehicle.

The legs 2 and the rollers 4 have been shown in FIG. 1 in solid lines in their initial position, while the second final position has been shown in dash lines; it is assumed that the vehicle moves in the direction of the arrow. Of course, the stroke of the swinging movement of the legs about the vertical axis may be chosen larger if this is desirable in view of the displacement of the vehicle. As seen in FIG. 2 the front legs travel from an initial position extending forwardly in the intended direction of travel and parallel to these vertical center plane of body 1, to its final position extending obliquely rearwards, whereas in the initial position the rear legs extend obliquely forwards and in the final position they extend rearwardly parallel to the vertical center place of the body.

During the swinging movements of the legs 2 the main body 1 may either remain completely free from the ground or be dragged over the ground or alternately be supported on the ground and lifted from the ground. In the latter case the main body 1 is preferably supported on the ground, when the legs are in their initial positions and pressed on the ground with the rollers 4, after which the main body 1 is lifted and subsequently displaced to the front.

Due to the fact that the axles 3 may be turned together with the rollers 4 through a certain angle about the longitudinal axis of the legs 2, the rollers 4 may always get optimum support on the ground when the vehicle moves over an uneven terrain. It is found that the rollers do not cause any substantial damage of the terrain during the movement of the vehicle, which may be of great importance under circumstances.

The vehicle may also be driven, if this is allowed by the condition of the ground surface. For this purpose the legs 2 are fixed in a position in which they lie in planes in parallel with the vertical center plane of the main body 1, while the rollers 4 are rotatable about their axles 3, which are in a horizontal position, and are supported on the ground, so that the main body is free from the ground. The vehicle may now be moved, for instance by means of a tractor.

It is also possible to provide the main body 1 with preferably detachable wheel sets (not shown) in which the wheels may be coupled with a driving member. In this case the vehicle may displace itself over a flat terrain.

The main body 1 may also be provided with a screw propeller (not shown) for the displacement through water. However, if the vehicle is to be displaced through a body of water in which the use of a screw propeller is impossible or very difficult, the vehicle may be propelled by bringing the legs 2 by means of the cylinder-piston units 5 and 6 into a composite horizontal and vertical swinging movement. In this case the reaction bodies, such as the rollers 4 in the embodiment as shown, may perform an active stroke under the water surface and a return stroke above the water surface.

As an alternative it is also possible that the legs 2 only move to the front and to the back around their vertical axes. In this case the rollers 4 remain under the water surface and occupy, during the active stroke, a position in which a large surface is perpendicular to their direction of movement, while they are turned about the longitudinal axes of the legs 2 during the return stroke in such manner that only a small surface is perpendicular to the direction of movement.

Although the reaction bodies are formed as rollers in the embodiment as shown, they may also have the shape of plate elements (not shown), particularly for the displacement of the vehicle through water.

During the active stroke, the reaction bodies may occupy an inclined position in the water, so that a lift is exerted, whereby the vehicle is moved upward during the active stroke, so that the resistance exerted on the vehicle during its movement is reduced.

The invention is not restricted to the embodiment shown in the drawings which may be modified in various ways within the scope of the appended claims.

I claim:

1. A self propelling transport vehicle adapted for displacement over land and/or through water comprising:

a main body having a substantially rectangular plan form with a vertical center plane, front and rear pairs of legs connected to said body substantially at the corners thereof in pairwise symmetry with respect to said vertical center plane, means pivotably connecting each of said legs to said body for pivotal movement about vertical and horizontal axes, said legs having free ends, reaction bodies mounted at the free ends of said legs, and power means for driving each leg, individually of the other legs, about said vertical and horizontal axes, said front pair of legs being movable between a first position in which the legs extend parallel to said vertical center plane and face forwardly in the intended direction of travel and a second position extending obliquely rearwards with respect to said body, said rear pair of legs being movable between a first position in which the legs extend obliquely forwards with respect to said body and a second position in which the legs extend rearwardly and parallel to the vertical center plane, said power means being coupled to said legs to drive at least one pair thereof from its first to its second position to cause said body to be propelled forwardly by the forces exerted on said reaction body by the material traversed by said vehicle, said one pair of legs then being returned by said power means to its first position with the body resting on the ground, when it travels on land, or immersed in water when traveling therethrough, whereafter by repeated movement of said legs between said first and second positions the vehicle can be successively propelled forwards.

2. The vehicle as claimed in claim 1 wherein each reaction body is supported from its respective leg for rotation about the longitudinal axis of the leg.

3. The vehicle as claimed in claim 1, wherein said reaction bodies are rollers.

4. The vehicle as claimed in claim 1, wherein said reaction bodies are hollow.

5. The vehicle as claimed in claim 1, wherein said power minus includes at least one cylinder-piston unit for each of said legs.

* * * * *